(12) United States Patent
Bonnin

(10) Patent No.: US 6,914,974 B2
(45) Date of Patent: Jul. 5, 2005

(54) COMMUNICATION ARRANGEMENT

(75) Inventor: David Frew Bonnin, Medindie (AU)

(73) Assignee: Telemedia Group Pty Ltd, North Adelaide (AU)

( * ) Notice: Subject to any disclaimer, the term of this patent is extended or adjusted under 35 U.S.C. 154(b) by 0 days.

(21) Appl. No.: 10/406,467

(22) Filed: Apr. 3, 2003

(65) Prior Publication Data

US 2003/0169869 A1 Sep. 11, 2003

Related U.S. Application Data

(63) Continuation of application No. PCT/AU01/01236, filed on Oct. 3, 2001.

(30) Foreign Application Priority Data

Oct. 3, 2000 (AU) ................................................ PR0562

(51) Int. Cl.[7] ................................................ H04M 3/00
(52) U.S. Cl. ......................... 379/265.02; 379/88.18; 379/265.01; 379/265.06
(58) Field of Search ..................... 379/88.16, 88.18, 379/88.26, 93.12, 210.01, 265.01, 265.02, 265.06, 265.09

(56) References Cited

U.S. PATENT DOCUMENTS

| | | | |
|---|---|---|---|
| 5,040,208 A | * 8/1991 | Jolissaint | ............... 379/210.01 |
| 5,299,260 A | 3/1994 | Shaio | |
| 5,311,574 A | * 5/1994 | Livanos | .................. 379/209.01 |
| 5,475,585 A | * 12/1995 | Bush | ........................... 705/26 |
| 5,590,187 A | * 12/1996 | Greenspan | ............. 379/212.01 |
| 5,724,092 A | * 3/1998 | Davidsohn et al. | ...... 348/14.01 |
| 5,914,951 A | * 6/1999 | Bentley et al. | ............. 370/352 |
| 5,946,387 A | 8/1999 | Miloslavsky | |
| 6,058,163 A | * 5/2000 | Pattison et al. | ......... 379/265.06 |
| 6,075,843 A | * 6/2000 | Cave | ........................ 379/88.13 |
| 6,230,197 B1 | * 5/2001 | Beck et al. | .................. 709/223 |
| 6,246,400 B1 | * 6/2001 | Bush | .......................... 345/721 |
| 6,606,374 B1 | * 8/2003 | Rokoff et al. | ............. 379/88.16 |
| 6,651,053 B1 | * 11/2003 | Rothschild | ...................... 707/3 |
| 6,724,887 B1 | * 4/2004 | Eilbacher et al. | ....... 379/265.03 |

FOREIGN PATENT DOCUMENTS

WO    WO 86/01960    3/1986

* cited by examiner

Primary Examiner—Bing Q. Bui
(74) Attorney, Agent, or Firm—Klauber & Jackson

(57) ABSTRACT

A method for surveying and changing telephony response systems which includes using a supplementary services provider adapted to handle a very much smaller number of calls than a main telephone network and which can therefore be readily modified from time to time in order to firstly improve any market survey approach or questions but as well, test suggested modifications in a response method or approach. Further there is disclosed a prompt call back system to assist in direct user feedback.

17 Claims, 1 Drawing Sheet

COMMUNICATION ARRANGEMENT

This application is a continuation of PCT/AU01/01236 filed on Oct. 3, 2001.

TECHNICAL FIELD

This invention relates to a method and means for improving marketing survey techniques.

BACKGROUND ART

It is currently known to provide various interactive responses through a telephony network for a variety of reasons.

Market surveys for all manner of services or goods are traditionally conducted in ways that have weakness'.

For greater depth a market surveyor will phone the target person some time after the call has been made and request feedback. Such an approach to collecting and using survey information has a number of difficulties. A first is simply getting the same person back sometime afterward presumes that the number is available and that the person is still available at the number. Further, market surveys are reliant upon people who are willing to spend some time responding. For people who might have little time, it is a further imposition to be called some time later at a time that may be inconvenient for no advantage whatsoever to the called person.

Further, when a person is phoned several weeks after the event and is asked to recall impressions and specifics it is difficult to obtain reliable and accurate responses. This is especially the case where there is an emotional response which may be important to the called person at the time of the event but is forgotten at the time of the follow-up enquiry except they may then have a negative attitude to the product or service but do not know why or even care they have that attitude. Current practices have a lack of accuracy.

Telephony networks in particular, can be very large indeed and have a variety of services including automatic responses for those wishing to use the services provided by or through a network and there are problems with their acceptance by callers so it is useful to be able to accurately survey their use as well.

The problem to which this invention relates to difficulties in assessing what is an effective approach in connection with provision of such survey services, identifying when there might be a problem or an improvement that might assist both in providing a better service or reducing costs or complexity or obtaining a better understanding of client interactions.

An object of this invention is to improve the results that might be obtained or at least provide a useful alternative.

DISCLOSURE OF THE INVENTION

In a broad aspect of the invention a method for monitoring contact made by a person using a telephony system to contact a service provider including the steps of controlling with a contact control means the selection of a contact, receiving a selected contact at said contact control system that provides a means to monitor the contact by a human operator and provides further means controllable by that human operator or automatically by said contact control system to direct said selected contact, to a selected contact entry point in the service provider's contact handling system or an alternative contact handling system; and/or out of said service provider's contact handling system or an alternative contact handling system, into either system, or terminating said contact; and, providing the capability for said human operator to monitor the interactions of both sides of the contact including at least the person's contact activities and one or more of the activities of the service provider's contact handling system or an alternative contact handling system and recording said interaction, and wherein said human operator contacts said person at any time during contact with the service provider or after termination of contact with the service provider.

In a further aspect the contact control means is a network environment.

In a further aspect the contact control system is a private branch exchange.

In yet another aspect the private branch exchange interacts with said network environment to maintain the capability for said human operator to monitor said interaction.

In another aspect a portion of said alternative contact handling system or a portion of said service provider's contact handling system is an interactive voice response system.

In yet a further aspect the recording includes recording at all times the experience of the person contacting the service provider whether they are being interviewed by said human operator or using the service provider's contact handling system or the alternative contact handling system.

In a further aspect the contact control system selects a contact based on a random selection of the contacts.

Assessments of callers can be monitored in real time with responses that can be tested in real time. In trials conducted so far the results have shown this concept is able to dramatically change the value of the survey. Real time monitoring and assessment is possible because it is immediate and because the emotional feelings of the caller are current and can be readily tested, thus the effectiveness of the survey technique has also increased.

BRIEF DESCRIPTION OF THE DRAWINGS

For a better understanding of this invention it will now be described with relation to actual examples where the description is assisted by reference to a drawing wherein.

BEST MODE FOR CARRYING OUT THE INVENTION

Figure 1:
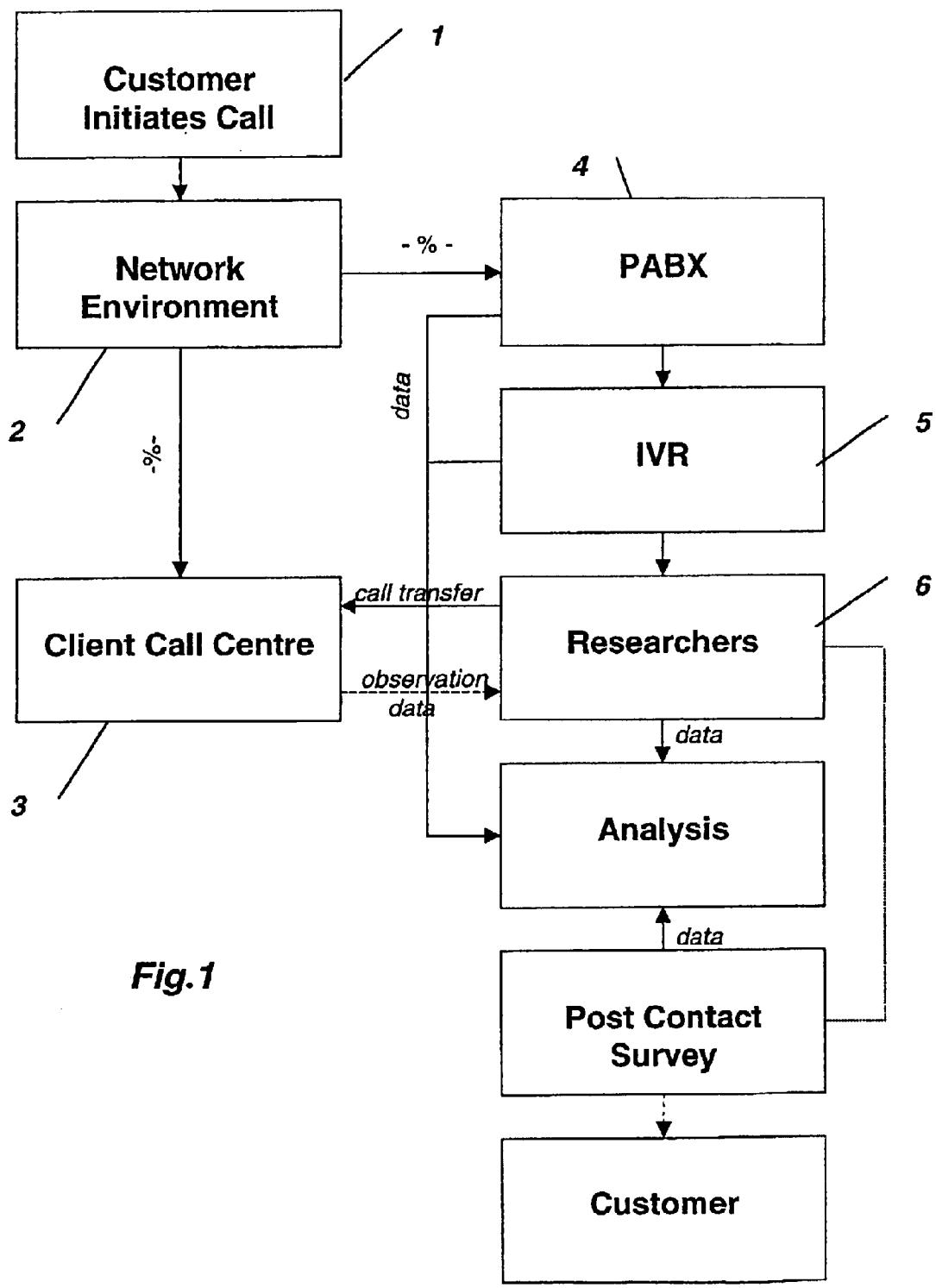
FIG. 1 is a schematic flow diagram showing how one aspect of the invention can be put into practice.

Referring to the drawing, there is shown at 1, the conventional step of a customer initiating a call which is then directed to a telephony network environment at 2 and traditionally this would then be directed to a client contact center which in one instance for example is a client call center at 3 and be attended to with traditional responses thereafter.

In accordance with this invention, there is provided an interconnect at the network environment stage at 2 into a market survey network which acts as a supplementary services provider which is commenced by providing a PABX system at 4.

This is then directed to an interactive voice response containing a program which then monitors in the researcher's premises, the customer following their interactive voice response experience.

There is also an arrangement for selecting a proportion only of the calls from the network environment and this can be either provided by determining that each call from a selected number of calls initiated, is directed to the PABX so as to be a proportion of all of the calls, or, in an alternative arrangement a more random approach is used, governed by the time, when a call is initiated within a selected time period, and then diverted to the PABX for separate attention by the supplementary services providing system. (This can be in one instance a major network provider but in another instance this can be a government organisation with its own network or a commercial entity which may be for instance a bank or an airline which has its own contracted network system).

This supplementary services providing system, which is the PABX in this case is connected to a computer providing the interactive voice response 5 and a researcher such as at 6. Thus there are a much smaller group of calls that can be attended to in a specific way.

With a major telephony network, there can be perhaps many millions of calls over a selected period which could never realistically be handled, this technique now allows for a managable portion to be dealt with.

If a survey according to current practices is in relation to services provided through the telephony network then what commonly happens is that some form of record of the process is kept and later studied, for instance a recording of a conversation perhaps one side only is made, and analyzed. For greater depth a market surveyor will use a list of previous callers who are then required to phone back the prior caller some time after the initial call was made for the purpose of asking for feedback.

Traditional techniques have a number of difficulties or areas that can be improved. Simply getting the same person back sometime afterward is a typical problem. Presuming that the number is available and the person is still at that number, follow up market surveys are reliant upon people who are willing to spend some time responding. For people who might have little time, it is a further imposition for someone to be calling some time later for no advantage to the prior caller. This in itself can cause resentment and can reduce or destroy entirely the accuracy of the follow-up survey.

This is not found to be anywhere near the same problem if the follow-up call is made immediately after an enquiry, perhaps because callers generally want a better result from their enquiries. This is a positive attitude held by callers at least for a short period after the initial call. Further, when a person is phoned several weeks after the event and is asked to recall impressions and specifics it is difficult to obtain reliable and factual responses. This is especially the case where there has been an emotional enquiry which may be important to the caller at the time of the event but is forgotten at the time of the follow-up enquiry except they may then have a negative attitude to the product or service but do not know why.

One part of the concept is selecting a relatively small proportion of incoming calls and dealing with those so that either an interactive voice response system duplicates the major networks response system or is modified in accordance with a selected different approach. This allows a supplementary services provider to test alterations to an interactive voice response system and obtain statistical bases for establishing the effectiveness of such changes and then whether such changes should be introduced into the network.

There is provided in the embodiment described, that during an interactive voice response program, a researcher can either interact directly during the call process, or can take the call and then measure, for analysis purposes, reactions and responses appropriate to the application.

Further, as is shown in the drawing, the researcher can direct a call simply back to the client call center 3 to be handled in the ordinary way.

Following such interception, the results can be automatically transferred to a further analysis program for building a statistical survey for assessment and recommendation purposes.

What has not been specifically referred to is the fact that a researcher once a call has been referred to such a researcher, may introduce the fact that the call is being selected for monitoring and research purposes and can obtain a consent from the caller.

In some countries, this will then avoid issues such as privacy and possible misuse of confidential information.

It is, of course, a feature of the arrangement that it can be the provider of the system itself that is using the invention or it can be a contracted supplier of the services.

A further significant advantage of the arrangement is that immediately following a call having been attended to by the supplementary services provider, there can be caused an immediate call back by a researcher further requesting information from the person who placed the call.

By having such an immediate reaction, this avoids the fact that a person may only be temporarily at a location, that they may have forgotten what might be a very incidental call requesting services and may have otherwise happened some weeks after the event and, in any event, a certainty that the person contacted is the person called in connection with a particular interactive voice response experience.

Further advantages of the specific example is that by having a supplementary services provider monitor the actual circumstances of the call including such things as actual menu selections, queue and hold times, without the need to ask customers to estimate such things a significant time after the event, provides for an accurate assessment of the callers experience.

In accordance with this invention then it will be seen that it provides the ability to capture a total call experience from the moment the customer dials the network provider until call termination.

From the customer point of view then, all of the processes normally experienced will be also experienced by the supplementary services provider including those associated with automatic call handling technologies, queue and hold times, operator contact, call transfers etc.

Further, because immediate post customer contact can occur within minutes of a termination of a live experience, this ensures that the customer experience is factored into customer research in a very realistic way.

This then contrasts with existing forms of research which may rely upon a call back method some weeks after an experience occurs with a customer with all the attendant problems of lack of accuracy in recall, lack of ability to determine which customer may have placed the call, lack of interest and, indeed, available time by many customers following what might be regarded by some of these as a relatively incidental event some weeks after the experience.

While the reaction to any given interactive voice response system can be gauged as applied to a customer, the method is also applicable to monitoring operator performance especially when, for instance, the call is received by the supplementary services provider and then directed to the client call center but then remaining connected so as to monitor all of the reactions and steps involved in that further interaction.

In a typical experience situation, a particular problem might be identified, for instance, by reason of complaints being received in connection with a particular service.

Conversely, a selected service can be chosen simply by reason of the volume of traffic passing through such service or by reason of apparent length of delays experienced in a particular service.

Once such a service has been selected, there can then be arranged for an intercept interconnection where by appropriate computer software connected with the network system, it is possible to select from each of a set number of calls, a much smaller proportion e.g. 1 in 100 or 1 in 10000 etc.

Alternatively, if the number of calls for a sample size is chosen, such as two or more intercept channels then the system simply takes a call as a time is available.

This then effects a pseudo random selection of calls.

Specific analysis might look at customer access issues relating to a selected channel e.g. a particular information phone contact, customer post contact expectations, repeat calls, calls transfers and complaint calls.

The invention may also apply to an arrangement for effecting monitoring of calls which includes the means to effect diversion of calls on a selected basis from time to time.

The results of the application of this invention has provided experimental results that indicate that changes could be made that will significantly improve both efficiency, customer satisfaction, and, of course, a saving of costs.

The claims defining the invention are as follows:

1. A method for monitoring a contact made by one or more persons using a telephony system to contact a service provider including the steps of:

controlling with a contact control system the selection of a contact by a person while the contact is in the telephony system, the selection being made from the one or more persons contacting the service provider;

receiving a selected contact at said contact control system that provides a means to monitor the contact by a human operator; and providing further means controllable by that human operator or automatically by said contact control system to direct said selected contact to a selected contact entry point in the service provider's contact handling system or an alternative contact handling system; or out of said service provider's contact handling system or an alternative contact handling system or terminating said contact; and providing the capability for said human operator to monitor the interactions of both sides of the total duration of the contact including at least the person's contact activities and one or more of the activities of the service provider's contact handling system or an alternative contact handling system and recording said interactions, and wherein said human operator contacts said person at any time during contact with the service provider or after termination of contact with the service provider.

2. A method according to claim 1 wherein said contact control system is a network environment.

3. A method according to claim 1 wherein said contact control system is a private branch exchange.

4. A method according to claim 2 or 3 wherein said private branch exchange interacts with said network environment to maintain the capability for said human operator to monitor said interaction.

5. A method according to claim 1 wherein said contact control system is physically remote from said service provider's contact handling system.

6. A method according to claim 1 wherein said alternative contact handling system is the same as said service provider's contact handling system.

7. A method according to claim 1 wherein said alternative contact handling system is different from said service provider's contact handling system for evaluation of the alternate contact system and comparison with the service provider's contact handling system.

8. A method according to claim 1 wherein said contacting person is asked for a call back contact number.

9. A method according to claim 1 wherein a portion of said alternative contact handling system or a portion of said service provider's contact handling system is an interactive voice response system.

10. A method according to claim 9 wherein said recording includes recording of the interaction of the said person contacting the service provider while they interact with said interactive voice response system.

11. A method according to claim 1 wherein said contact control system selects a contact based on a random selection of the contacts.

12. A method according to claim 11 wherein the random selection is made from those contacts being made within a predetermined period of time.

13. A method according to claim 11 wherein the random selection is made from those contacts being made to a predetermined one of a plurality of contact reception points of a said service provider.

14. A method according to claim 11 wherein the quantity of random selections is determined by the availability of said human operator.

15. A method according to claim 1 further including the step of requesting permission from said selected contact.

16. A method according to claim 15 wherein the step of obtaining permission is conducted by an interactive voice response system.

17. A method according to claim 15 wherein the step of obtaining permission is conducted by said human operator.

* * * * *